United States Patent
Okada

(10) Patent No.: US 11,298,990 B2
(45) Date of Patent: Apr. 12, 2022

(54) TIRE PRESSURE MONITORING SYSTEM

(71) Applicant: DENSO CORPORATION, Kariya (JP)

(72) Inventor: Noriaki Okada, Kariya (JP)

(73) Assignee: DENSO CORPORATION, Kariya (JP)

( * ) Notice: Subject to any disclaimer, the term of this patent is extended or adjusted under 35 U.S.C. 154(b) by 577 days.

(21) Appl. No.: 16/326,286

(22) PCT Filed: Sep. 4, 2017

(86) PCT No.: PCT/JP2017/031840
§ 371 (c)(1),
(2) Date: Feb. 18, 2019

(87) PCT Pub. No.: WO2018/047782
PCT Pub. Date: Mar. 15, 2018

(65) Prior Publication Data
US 2019/0184774 A1    Jun. 20, 2019

(30) Foreign Application Priority Data

Sep. 6, 2016  (JP) .............................. JP2016-173734

(51) Int. Cl.
*B60C 23/04* (2006.01)
*G01L 17/00* (2006.01)
*G07C 5/08* (2006.01)
*B60C 23/20* (2006.01)

(52) U.S. Cl.
CPC .......... *B60C 23/0438* (2013.01); *B60C 23/04* (2013.01); *G01L 17/00* (2013.01); *G07C 5/0808* (2013.01); *B60C 23/20* (2013.01)

(58) Field of Classification Search
CPC ..... B60C 23/0438; B60C 23/04; B60C 23/20; B60C 23/0442; B60C 23/0462; G01L 17/00; G07C 5/0808
See application file for complete search history.

(56) References Cited

U.S. PATENT DOCUMENTS

2007/0194896 A1* 8/2007 Ehrlich .................. B60C 23/009
                                                                340/447
2015/0149110 A1* 5/2015 Shin .................... B60C 23/0476
                                                                702/130

FOREIGN PATENT DOCUMENTS

JP         2013006588 A         1/2013

* cited by examiner

*Primary Examiner* — Michael V Kerrigan
(74) *Attorney, Agent, or Firm* — Harness, Dickey & Pierce, P.L.C.

(57) ABSTRACT

A sensor transceiver transitions into a first state that is capable of receiving RF waves intermittently. Upon starting to receive a burst signal on RF waves from a vehicle-body system under the first state, the sensor transceiver transitions into a second state that is capable of receiving RF waves continuously. Upon receiving a request signal on RF waves from the vehicle-body system under the second state, the sensor transceiver transmits data on tire pressure to the vehicle-body system.

8 Claims, 6 Drawing Sheets

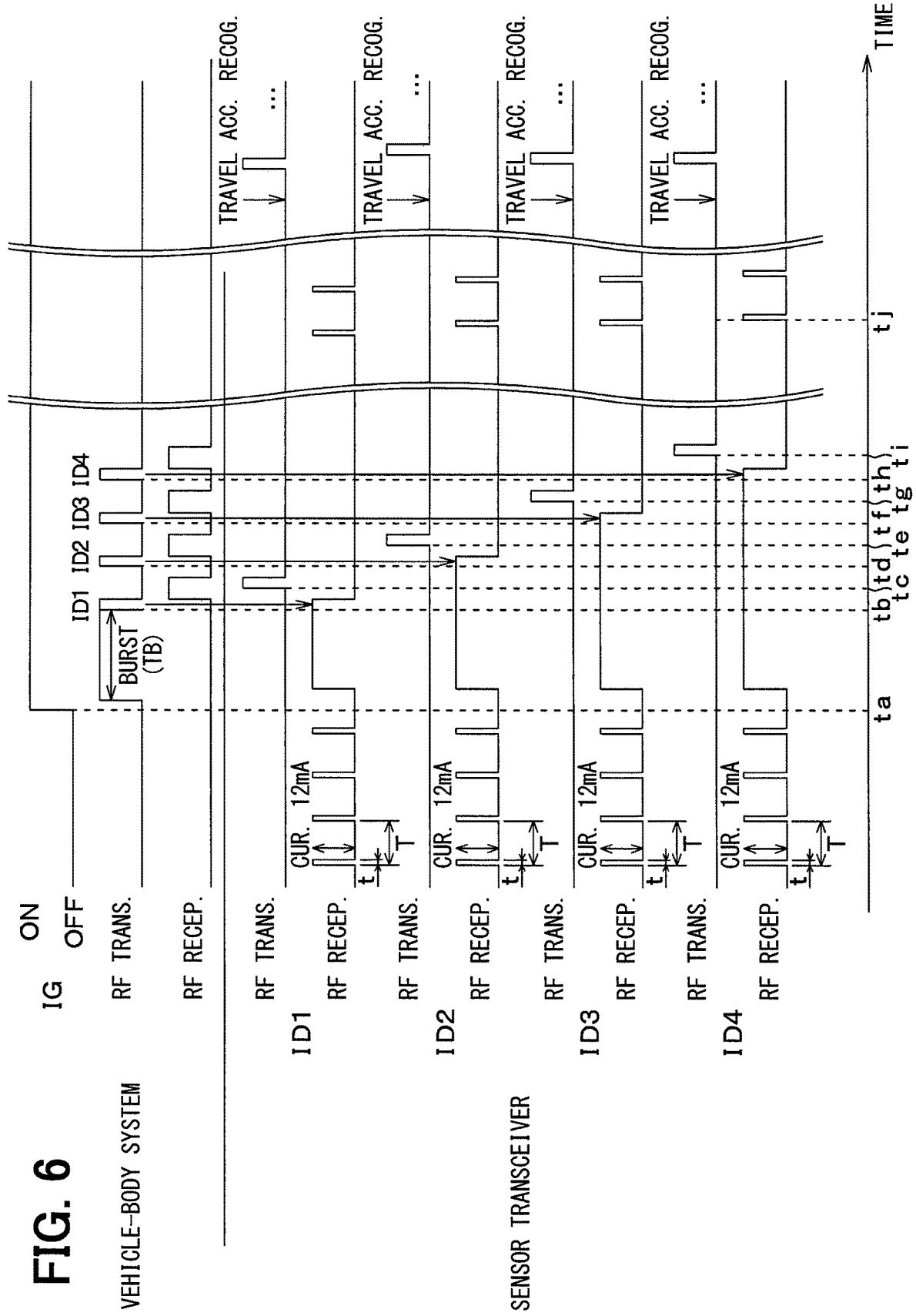

TIRE PRESSURE MONITORING SYSTEM

CROSS REFERENCE TO RELATED APPLICATIONS

This application is a U.S. National Phase Application under 35 U.S.C. 371 of International Application No. PCT/JP2017/031840 filed on Sep. 4, 2017. This application is based on and claims the benefit of priority from Japanese Patent Application No. 2016-173734 filed on Sep. 6, 2016. The entire disclosures of all of the above applications are incorporated herein by reference.

TECHNICAL FIELD

The present disclosure relates to a tire pressure monitoring system (hereinafter referred to as TPMS: Tire Pressure Monitoring System).

BACKGROUND

There is conventionally known a direct-type tire pressure monitoring system as one of tire pressure monitoring systems (e.g., refer to Patent literature 1). In such a direct-type TPMS, a sensor transmitter including a pressure sensor is provided to be directly attached to a wheel which a tire of a vehicle is attached to; in contrast, an antenna and a receiver are provided in the vehicle itself. When the sensor transmitter transmits a detection result as a detection signal of the pressure sensor, the detection signal is received by the receiver via the antenna. This allows the detection of the tire pressure.

PRIOR ART LITERATURE

Patent Literature

Patent Literature 1: JP 2013-006588 A

SUMMARY OF INVENTION

In the above TPMS, the tire pressure is detected only while the ignition switch (hereinafter referred to as IG) of the vehicle is in ON state. Thus, the information on tire pressure available immediately after the IG transitions into ON state is only the information on tire pressure collected before the vehicle is parked; therefore, the tire pressure cannot be detected based on the information on tire pressure during OFF state of the IG. Even during the stop of the vehicle, the tire pressure however decreases naturally due to a spontaneous factor or a puncture. This eventually requires the tire pressure to be detected as soon as possible after the IG transitions into ON state.

There is also known a different-type TPMS in which antennas capable of transmitting LF (Low Frequency) waves are disposed near the respective tires. In such a TPMS, each antenna transmits the LF waves after the IG transitions into ON state; upon receiving the LF waves, the sensor transmitter provided for each tire is caused to transmit the data on tire pressure. This configuration however needs to install an antenna that transmits LF waves near each wheel, or an LF transmission driver for transmitting the LF waves, thereby increasing the number of parts and resulting in a high cost system.

To respond thereto, the present inventor has studied a configuration that transmits RF (Radio Frequency) waves that include UHF (Ultra High Frequency) waves, instead of the LF waves, to a sensor transmitter after the IG transitions into ON state. The RF waves are already used for transmitting a detection result such as a tire pressure from each sensor transmitter. The sensor transmitters thus already include the respective transmission units and antennas that perform RF transmission. Further, an RF transmission unit for RF transmission and an RF reception unit for RF reception may be integrated into a common part; an RF-transmission antenna for RF transmission and an RF-reception antenna for RF reception may also be integrated into a common part. Such integrating either (i) an RF transmission unit and an RF reception unit or (ii) an RF-transmission antenna and an RF-reception antenna into a common part may suppress the increase in the number of parts and achieve a low cost system. Herein, if the RF reception is continuously performed, the current consumption increases because the RF waves are high frequency range. The sensor transmitter with a battery is provided in the tire to be isolated from the vehicle body; the current consumption needs to be reduced also from the viewpoint of the life of the battery in the sensor transmitter. If only the RF waves are transmitted to the sensor transmitter after the IG transitions into ON state, the battery life will be reduced.

It is an object of the present disclosure to provide a TPMS capable of detecting a tire pressure earlier when there is a possibility that a vehicle starts to run, while suppressing an increase in current consumption without need of an antenna for transmitting LF waves arranged adjacent to each wheel of the vehicle.

According to an aspect of the present disclosure, a TPMS is provided to include (i) a plurality of sensor transceivers provided to and respectively corresponding to a plurality of wheels of a vehicle and (ii) a vehicle-body system provided in a vehicle body of the vehicle. Each of the sensor transceivers includes: a sensing unit configured to detect a tire pressure of a tire of a corresponding wheel among the plurality of wheels; a first control unit configured to prepare a frame that stores data on the tire pressure; a first transmission unit configured to transmit the frame prepared by the first control unit on RF waves; and a first reception unit configured to receive RF waves. The vehicle-body system includes: a second reception unit configured to receive a received frame that is a frame transmitted from each of the sensor transceivers; a second control unit configured to detect a tire pressure of each of the tires of the plurality of wheels based on the received frame; and a second transmission unit configured to transmit RF waves to be received by the first reception unit. Herein, in the vehicle-body system, in response to detecting that there is a possibility that the vehicle starts to run, the second control unit outputs a burst signal on RF waves and then a request signal on RF waves to each of the sensor transceivers. The burst signal causes the first reception unit of each of the sensor transceivers to transition into a state that is capable of continuously receiving RF waves. The request signal requests each of the sensor transceivers to transmit the frame. Further, in each of the sensor transceivers, (i) the first control unit sets the first reception unit to a standby state that is capable of intermittently receiving RF waves, (ii) in response to that the first reception unit receives the burst signal under the standby state, the first control unit causes the first reception unit to transition into the state capable of continuously receiving RF waves to receive the request signal, and (iii) in response to that the first reception unit receives the request signal, the first control unit transmits the frame as a response to the request signal.

In this way, the sensor transceiver is caused to be under a first state capable of intermittently receiving RF waves. Further, when receiving a burst signal on RF waves from the vehicle-body system under the first state, the sensor transceiver is then caused to transition into a second state capable of continuously receiving RF waves. Upon receiving a request signal on RF waves from the vehicle-body system under the second state, the sensor transceiver transmits the data on tire pressure to the vehicle-body system. This configuration enables the tire pressure to be detected earlier.

Further, before receiving a burst signal, the sensor transceiver is under a standby state capable of receiving RF waves but capable of receiving the RF waves just only intermittently. The current consumption can thus be reduced. Furthermore, the above configuration does not need to install an antenna or the like for transmitting LF waves near each wheel.

That is, even without the installation of an antenna or the like for transmitting the LF waves in the vicinity of each of the wheels, a TPMS capable of detecting a tire pressure earlier may be provided while an increase in current consumption is suppressed.

BRIEF DESCRIPTION OF DRAWINGS

FIG. 6 is a time chart showing an operation of the TPMS shown in FIG. 1.

DETAILED DESCRIPTION

Figure 1:
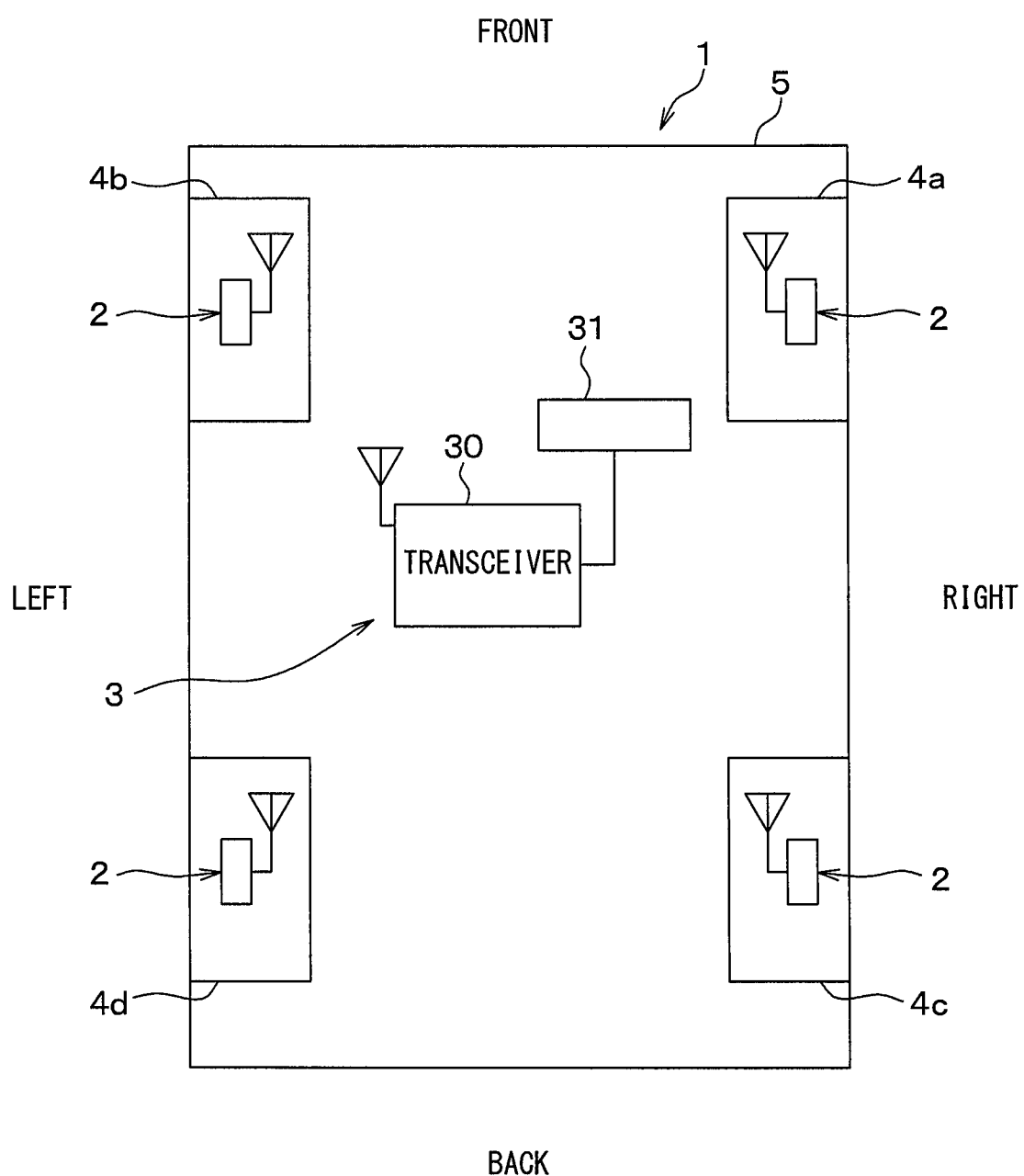
FIG. 1 is a diagram showing an overall configuration of a TPMS according to a first embodiment.

Embodiments of the present disclosure will be described below with reference to the drawings. In the following embodiments, the description will be made by denoting the same or equivalent parts by the same reference numerals or signs.

First Embodiment

The first embodiment will be described with reference to FIGS. 1 to 6. FIG. 1 is a block diagram showing an overall configuration of a TPMS (i.e., Tire Pressure Monitoring System) in a vehicle 1 according to the present embodiment. The top and the bottom of FIG. 1 correspond, respectively, to the front and the back of the vehicle 1.

As shown in FIG. 1, the TPMS, which is attached to the vehicle 1, includes (i) a plurality of sensor transceivers 2 and (ii) a vehicle-body system 3.

As shown in FIG. 1, the sensor transceiver 2 (i.e., each of the sensor transceivers 2) is attached one by one to each of the wheels 4a to 4d of the vehicle 1. The sensor transceiver 2 functions primarily as a transmitter; the transmitter detects a tire pressure of a tire attached to each of the wheels 4a to 4d and an inside temperature of the tire while the vehicle 1 is traveling, and the transmitter then transmits a frame that stores the data of a detection signal indicating a detection result. In addition, the sensor transceiver 2 also functions as a receiver which receives RF waves that include UHF (Ultra High Frequency) waves transmitted from the vehicle-body system 3 as described later. When receiving the RF waves, the sensor transceiver 2 also detects a tire pressure and an inside temperature as a detection result, and transmits a frame that stores the data indicating the detection result. Here RF may be referred to as a first frequency range, whereas LF may be referred to as a second frequency range that is lower in frequency than that of the first frequency range.

In contrast, the vehicle-body system 3, which is provided in the vehicle body 5 of the vehicle 1, receives a frame transmitted from each of the sensor transceivers 2 while performing various processes, calculations, etc. based on the data stored in the frame, to thereby obtain a tire pressure. Further, the vehicle-body system 3 is configured to transmit RF waves to the sensor transceivers 2 when the IG (unshown) transitions into ON state. Each of the sensor transceivers 2 is thereby caused to transmit a detection result of a tire pressure and an inside temperature of the corresponding tire promptly to the vehicle-body system 3. The vehicle-body system 3 warns a user by notifying the user of an abnormality in the tire pressure, if such an abnormality is found from the detection result transmitted from each of the sensor transceivers 2.

Detailed configurations of the sensor transceiver 2 and the vehicle-body system 3 will be described with reference to FIGS. 2 and 3.

Figure 2:
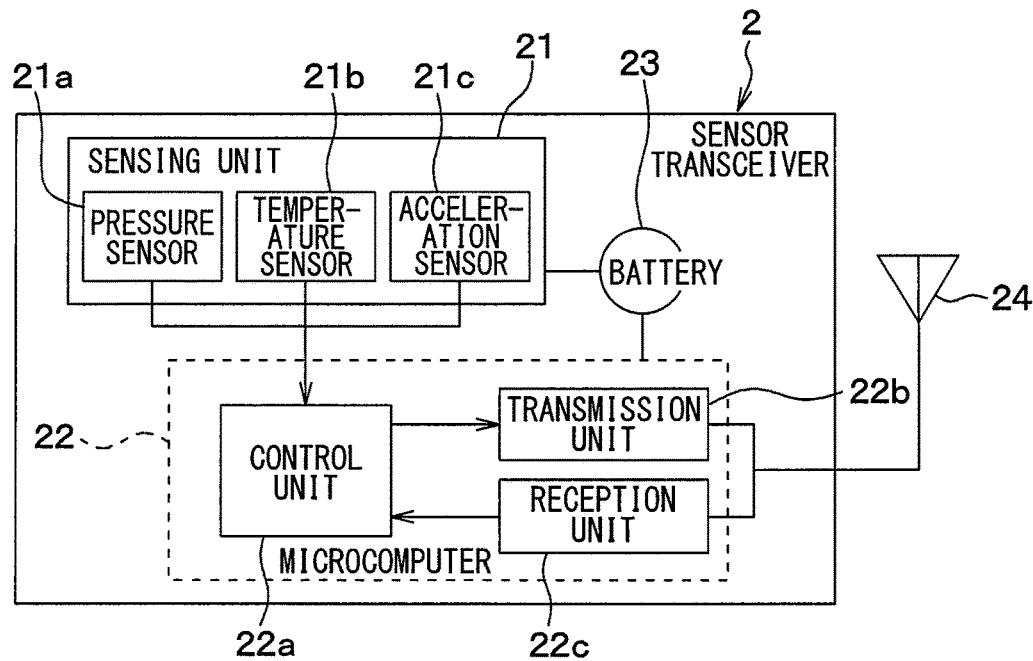
FIG. 2 is a block diagram showing details of a sensor transceiver.

As shown in FIG. 2, the sensor transceiver 2 includes a sensing unit 21 (also referred to as a sensor), a microcomputer 22, a battery 23, and an antenna 24.

The sensing unit 21 includes a pressure sensor 21a, a temperature sensor 21b, and an acceleration sensor 21c. The sensing unit 21 outputs a detection signal (also referred as a detection signal on tire pressure) indicating a tire pressure and an inside temperature of each tire using the pressure sensor 21a and the temperature sensor 21b, and inputs the detection signal to the microcomputer 22. The sensing unit 21 outputs a detection signal of an acceleration including a radial acceleration component (i.e., a centrifugal acceleration component) of the corresponding wheel of the wheels 4a to 4d using the acceleration sensor 21c, and inputs the detection signal to the microcomputer 22. The sensing unit 21 detects an acceleration every predetermined detection cycle repeatedly based on an instruction from the microcomputer 22. The sensing unit 21 detects a tire pressure and an inside temperature of the tire every predetermined transmission cycle repeatedly while the vehicle 1 continues running after the instruction from the microcomputer 22.

The microcomputer 22, which is a well-known microcomputer including a CPU, a ROM, a RAM, and an I/O, executes predetermined processes according to programs stored in the ROM or the like. Specifically, the microcomputer 22 includes a control unit 22a (also referred to as a controller), a transmission unit 22b (also referred to as a transmitter), and a reception unit 22c (also referred to a receiver); the microcomputer 22 performs various processes related to tire pressure monitoring in accordance with programs stored in a built-in memory of the control unit 22a.

The control unit 22a, which corresponds to a first control unit or a first controller, causes the reception unit 22c to be in a standby state enabling the sensor transceiver 2 to receive RF waves while the IG of the vehicle 1 is in OFF state and the vehicle 1 is thus stopped. The sensor transceiver 2 under the standby state is thereby ready to receive RF waves, which will be transmitted from the vehicle-body system 3 in response to that the IG will transition from OFF state into ON state. Suppose a case where the reception unit 22c is always kept in a standby state capable of continuously receiving RF waves. In such a case, since the RF waves are high frequency range, the current consumption may be increased significantly. To respond thereto, the control unit 22a causes the reception unit 22c to transition into a standby state capable of intermittently receiving the RF waves every predetermined cycle, for instance.

Specifically, a burst signal is transmitted on RF waves from the vehicle-body system 3 so as to enable the reception unit 22c of each sensor transceiver 2 to transition into a state capable of continuously receiving RF waves. Subsequently, a request signal is transmitted on RF waves from the vehicle-body system 3; the request signal is for requesting each sensor transceiver 2 to transmit the data (hereinafter referred to as data on tire pressure) indicating a detection result of a tire pressure and an inside temperature of a tire.

That is, upon receiving a burst signal, the control unit 22a causes the reception unit 22c to be maintained in a state capable of continuously receiving RF waves until the request signal is received. The request signal stores a unique identification information-item (hereinafter referred to as an ID information-item) of each sensor transceiver 2. More specifically, the vehicle-body system 3 outputs or transmits the request signals storing the ID information-items of the respective sensor transceivers 2 sequentially with the transmission time frames shifted therebetween. For this reason, the control unit 22a of each sensor transceiver 2 sets the reception unit 22c in a standby state capable of continuously receiving the RF waves until a request signal including its own ID information-item is received, and releases the standby state of the reception unit 22c in response to that the request signal is received. Of course, it may be assumed that a signal similar to a burst signal may be received in a noise-like manner and any request signal may thereafter not arrive. It is therefore preferable that the control unit 22a employs a timeout condition. That is, if any request signal does not arrive for a predetermined period of time, the control unit 22a may release the reception unit 22c from the state capable of continuously receiving RF waves to return to the standby state where the RF signal can be intermittently received.

Then, upon receiving a request signal including the ID information-item of its own, the control unit 22a performs processing for transmitting the data on tire pressure to the vehicle-body system 3 as a response to the request signal. Specifically, the control unit 22a performs as follows: receiving a detection signal on tire pressure from the sensing unit 21; performing signal processing on the detection signal while processing the detection signal as needed; storing a detection result as data on tire pressure onto the frame along with the ID information-item of each sensor transceiver 2; and transmitting the frame to the transmission unit 22b.

Also, after the IG transitions into ON state, the control unit 22a performs different operations depending on whether or not the vehicle 1 is traveling. That is, the detection of a tire pressure is desired during traveling of the vehicle 1. During traveling of the vehicle 1, the control unit 22a thus causes the sensing unit 21 to detect a tire pressure and an inside temperature of a tire every predetermined transmission cycle and prepares a data on tire pressure based on the tire pressure and the inside temperature and transmits the data on tire pressure to the transmission unit 22b. In contrast, the detection of a tire pressure is not strongly desired during stopping of the vehicle 1. Further, the sensor transceiver 2 cannot grasp whether IG is in ON state or in OFF state. Therefore, if the vehicle 1 is not traveling, the control unit 22a basically transitions into a sleep state and then wakes up from the sleep state every predetermined cycle to cause the reception unit 22c to transition into a standby state that is capable of intermittently receiving RF waves, like in OFF state of the IG. Whether the vehicle 1 is traveling or not may be detected based on the detection signal of the acceleration sensor 21c.

The transmission unit 22b, which corresponds to a first transmission unit or a first transmitter, functions as an output unit that transmits a frame sent from the control unit 22a to the vehicle-body system 3 via the antenna 24. In the present embodiment, the transmission unit 22b is configured as an RF transmission unit that performs frame transmission on RF waves.

The reception unit 22c, which corresponds to a first reception unit or a first receiver, functions as an input unit that receives RF waves sent from the vehicle-body system 3 via the antenna 24. When receiving a burst signal or a request signal on RF waves from the vehicle-body system 3, the reception unit 22c conveys the burst signal and the request signal to the control unit 22a. The reception unit 22c is usually in a state incapable of receiving RF waves, but the reception unit 22c is enabled to enter a standby state that is capable of RF waves in accordance with a request from the control unit 22a.

Note that the transmission unit 22b and the reception unit 22c are described here as separate functional blocks, but both units can be made common or be integrated into a common part. That is, the function of transmitting and receiving RF waves can be realized by the same structure. Therefore, the transmission unit 22b and the reception unit 22c may be configured as a common part being one transmission/reception unit, achieving a low cost system. Of course, even if the transmission unit 22b and the reception unit 22c are configured as separate parts, the antenna 24 can be made common or shared by both. Even in that case, a low cost system can be achieved.

The battery 23 supplies power to the control unit 22a and the like. Upon receipt of power supplied from the battery 23, the sensing unit 21 can perform the collection of data on tire pressure or the acceleration detection and the control unit 22a can perform various calculations. The sensor transceiver 2 is provided in each tire; the replacement of the battery 23 is not easy, and the suppression of current consumption is required. Shortening the period of time for which the reception unit 22c is actuated, as described above, can thus provide an effect to suppress the current consumption.

The antenna 24 receives RF waves transmitted from the vehicle-body system 3 and transmits RF waves to the vehicle-body system 3. That is, the antenna 24 performs the transmission and reception of RF waves. Although the antenna 24 may be configured as separate antennas, respectively, for LF wave transmission and RF wave transmission, the antenna 24 may be configured as a single antenna to reduce the number of parts to achieve a low cost.

The sensor transceiver 2 is attached to, for example, an air injection valve provided in each of the wheels 4a to 4d; the sensing unit 21 is provided to be exposed to an inside of the tire. After the IG transitions into ON state, the sensor transceiver 2 detects a tire pressure of the corresponding wheel and transmits a frame storing data on tire pressure through the antenna 24. Also, while the vehicle 1 is traveling, the sensor transceiver 2 detects a tire pressure of the corresponding wheel and transmits a frame storing data on the tire pressure through the antenna 24 every predetermined periodic transmission cycle, for example, every one minute.

The data on tire pressure is sent together with the ID information-item of the sensor transceiver 2. The position of each wheel can be specified by a well-known wheel position detection apparatus that detects which position of the vehicle each of the wheels is attached to of the data on tire pressure to the transceiver 30 together with the ID information-item thus enables the determination of, among the wheels, the wheel which the data comes from.

Figure 3:
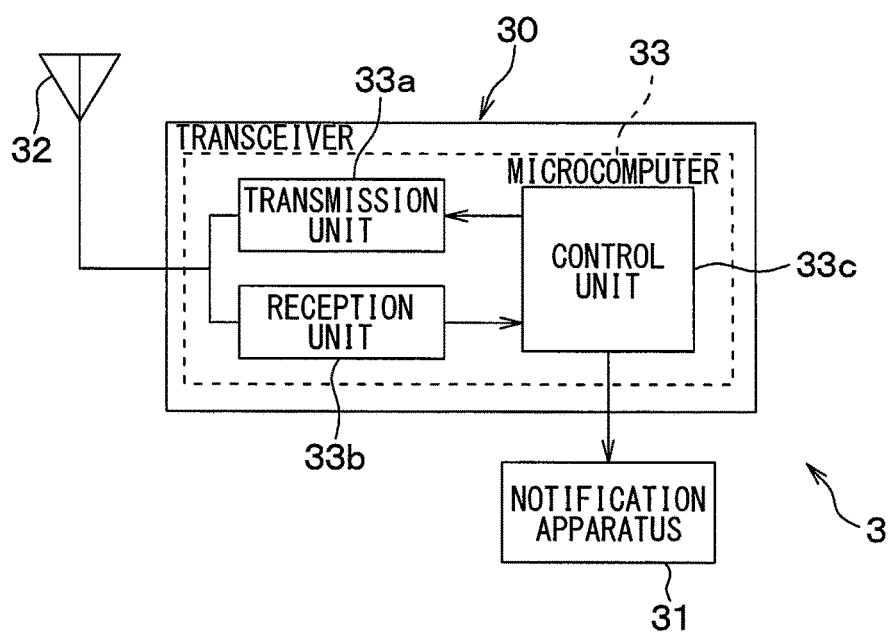
FIG. 3 is a block diagram showing details of a vehicle-body system.

In contrast, as shown in FIG. 3, the vehicle-body system 3 is configured to include a transceiver 30 and a notification apparatus 31. Each unit included in the vehicle-body system 3 is connected through an in-vehicle LAN (Local Area Network) like CAN (Controller Area Network) communication. Thus each unit is capable of communicating information mutually through the in-vehicle LAN.

The transceiver 30 includes an antenna 32 and a microcomputer 33.

The antenna 32 outputs a burst signal or a request signal on RF waves to each sensor transceiver 2 while receiving a frame transmitted on RF waves from each sensor transceiver 2; the antenna 32 is arranged to be fixed to the vehicle body 5. Since both the transmission and the reception are on RF waves, the antenna 32 is provided as a common part for both the RF wave transmission and the RF wave reception; thus, the number of parts can be reduced, achieving a low cost system.

The microcomputer 33, which is a well-known microcomputer including a CPU, a ROM, a RAM, and an I/O, executes predetermined processes according to programs stored in the ROM or the like. Specifically, the microcomputer 33 includes a transmission unit 33a (also referred to as a transmitter), a reception unit 33b (also referred to as a receiver), and a control unit 33c (also referred to as a controller); the microcomputer 33 performs various processes related to the tire pressure monitoring in accordance with programs stored in a built-in memory of the control unit 33c.

The transmission unit 33a, which corresponds to a second transmission unit or a second transmitter, functions as an output unit that transmits a burst signal and a request signal on RF waves through the antenna 32. In accordance with an instruction from the control unit 33c, the transmission unit 33a transmits a burst signal or a request signal on RF waves via the antenna 32. When the IG switches from OFF state to ON state, the control unit 33c instructs the transmission unit 33a to output a burst signal; accordingly the transmission unit 33a transmits the burst signal on RF waves. Subsequently, the control unit 33c instructs the transmission unit 33a to output a request signal; accordingly, the transmission unit 33a transmits a request signal on RF waves. The control unit 33c transmits, to the transmission unit 33a, the request signals storing the ID information-items of the respective sensor transceivers 2 sequentially with the transmission time frames shifted therebetween. The transmission unit 33a transmits the received request signals sequentially to the respective sensor transceivers 2.

The reception unit 33b, which corresponds to a second reception unit or a second receiver, functions as an input unit that receives a frame from each sensor transceiver 2 via the antenna 32 and sends the frame to the control unit 33c.

The control unit 33c, which corresponds to a second control unit or a second controller, obtains a tire pressure by performing various signal processing, calculation, etc. based on the data on tire pressure stored in the received frame, and determines the tire pressure based on the obtained tire pressure. Specifically, the control unit 33c compares the tire pressure with a warning threshold value, and determines that the tire pressure is decreased in response to that the tire pressure becomes equal to or less than the warning threshold value. Then, when such a decrease in the tire pressure is detected, the control unit 33c outputs a signal indicating the decrease in the tire pressure to the notification apparatus 31. This informs the notification apparatus 31 that the tire pressure of any one of the tires of the wheels 4a to 4d is decreased.

Further, when the IG is switched from OFF state to ON state, the control unit 33c instructs the transmission unit 33a to output a burst signal. As a result, the transmission unit 33a transmits a burst signal on RF waves through the antenna 32, and the reception unit 22c of each sensor transceiver 2 comes to be in a state that is ready to receive RF waves. Further, after instructing an output of the burst signal, the control unit 33c sequentially outputs the request signals instructing transmission of data on tire pressure to the respective sensor transceivers 2. That is, the request signal is transmitted the number of times corresponding to the number of the wheels 4a to 4d, and the ID information-item of each sensor transceiver 2 is sequentially included in each request signal. As a result, when the IG is switched from OFF state to ON state, the data on tire pressure is also sent from each sensor transceiver 2 to the transceiver 30, and a decrease in the tire pressure of each of the wheels 4a to 4d may be determined.

The notification apparatus 31, which is disposed in a place to be seen by a driver being a user during driving the vehicle, is installed in the instrument panel of the vehicle 1, for example. The notification apparatus 31 includes a meter display or an alarm lamp. When the control unit 33c of the transceiver 30 issues an instruction to report the decrease in the tire pressure, the notification apparatus 31 performs a display to that effect to thereby notify the driver of the decrease in the tire pressure.

As described above, the TPMS according to the present embodiment is provided. Next, an operation example of the TPMS will be described. Note that various operations of the TPMS include conventional operations such as various processes performed by the sensor transceiver 2 for periodical transmissions or a process of determining a decrease in tire pressure performed when the transceiver 30 receives a frame transmitted periodically. For this reason, the following explains mainly a process when the IG is switched from OFF state to ON state with reference to FIGS. 4A, 4B, 5, and 6.

Figure 4A:
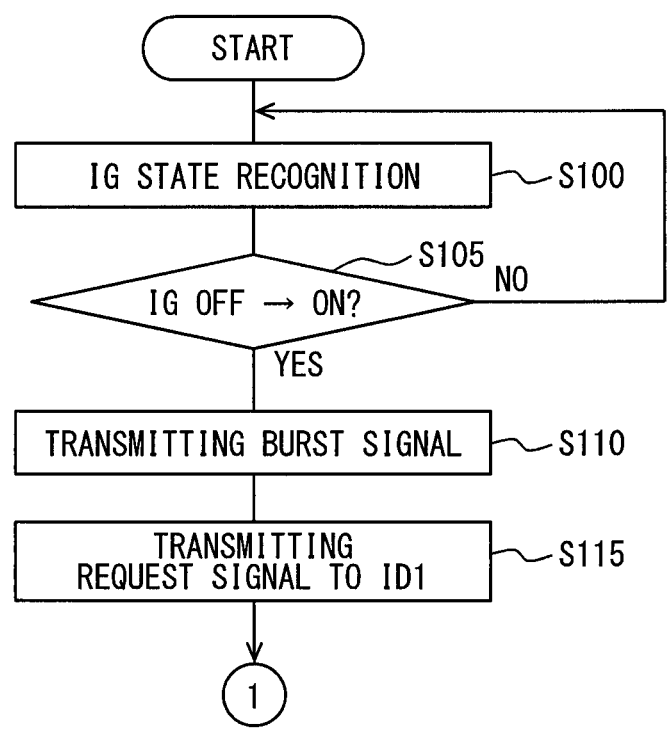
FIG. 4A is a flowchart showing details of a startup detection process executed by a control unit of a vehicle-body system.
Figure 4B:
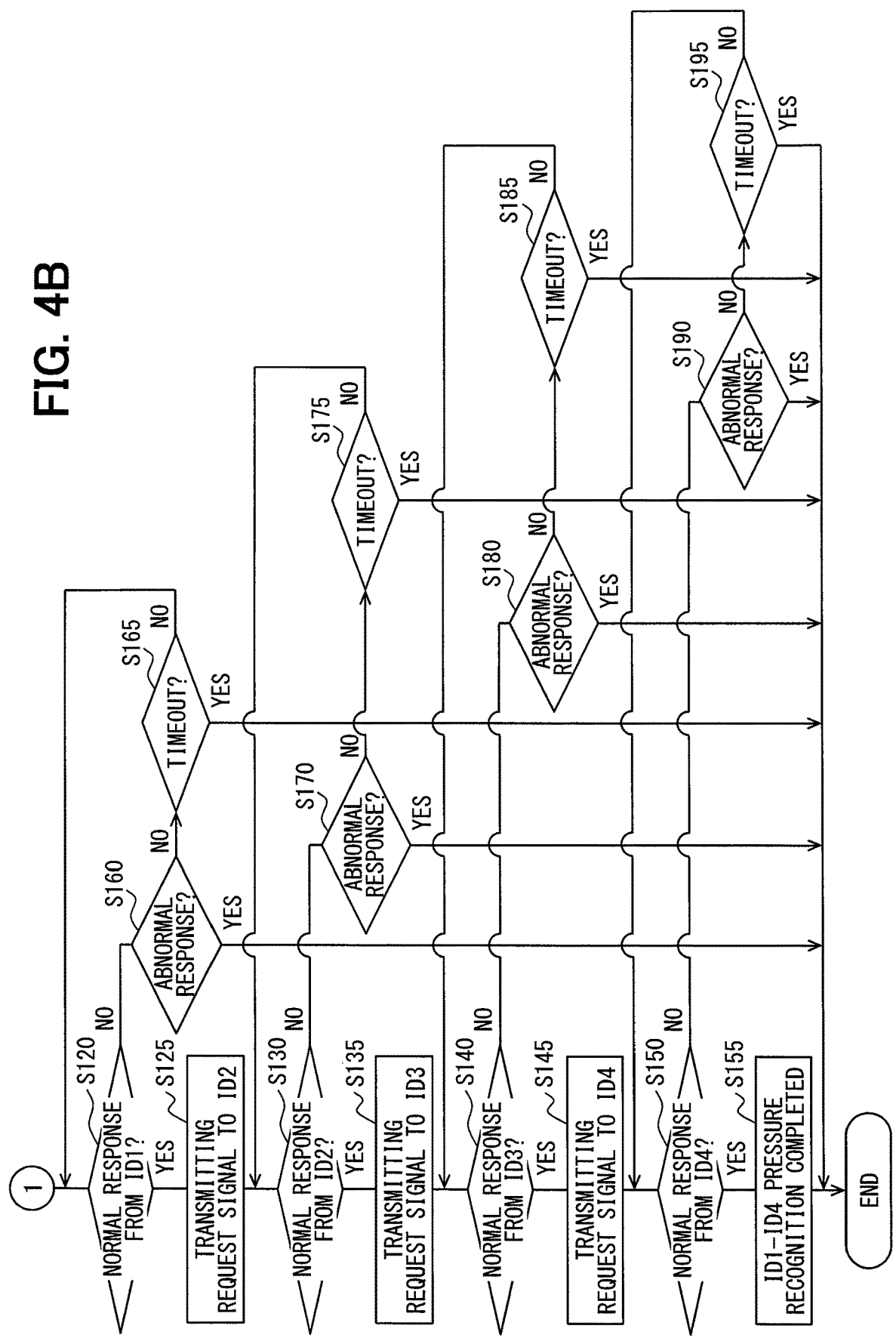
FIG. 4B is a flowchart showing details of a startup detection process following FIG. 4A.

In the vehicle-body system 3, the control unit 33c executes a startup detection process shown in FIG. 4A and FIG. 4B repeatedly every predetermined control cycle. In the following description, the ID information-item of each sensor transceiver 2 attached to each of the wheels 4a to 4d will be simply described as ID1 to ID4, respectively.

First, in step S100, a recognition process of the IG state is performed. This enables the recognition at to whether the IG is in ON state or in OFF state. Subsequently, the process proceeds to step S105, where it is determined whether the IG is switched from OFF state to ON state. When it is determined in S105 that the IG is switched from OFF state to ON state, the process proceeds to step S110. In contrast, when it is determined in S105 that the IG is either (i) under OFF state or (ii) under ON continued state that is a state where the ON state continues after switched from OFF state to ON state, the process returns to step S100.

Next, in step S110, the control unit 33c instructs the transmission unit 33a to transmit a burst signal. This causes the transmission unit 33a to transmit a burst signal through the antenna 32. When this burst signal is received by each sensor transceiver 2, each sensor transceiver 2 is enabled to be ready to receive RF waves.

Thereafter, the process proceeds to step S115 to instruct the transmission unit 33a to transmit a request signal to the sensor transceiver 2 with ID1. As a result, a request signal including ID1 as the ID information-item is transmitted from the transmission unit 33a through the antenna 32. Upon receiving this request signal, the sensor transceiver 2 with ID1 transmits a frame storing data on tire pressure and its own ID information-item, in response thereto.

Therefore, in step S120, the control unit 33c determines whether a normal response is received from the sensor transceiver 2 with ID1. Here, when a response is received from the sensor transceiver 2 with ID1, and a frame including the ID information-item of ID1 is received, an affirmative determination is made in step S120. When either (i) the frame is not received or (ii) an abnormal response is received from the sensor transceiver 2 with ID1, a negative determination is made in S120. Note that the abnormal response is a response, which is performed in the sensor transceiver 2 in cases that the data on tire pressure cannot be normally transmitted, e.g., due to a failure of the sensing unit 21, for example. In such cases, a frame indicating abnormal response is transmitted from the sensor transceiver 2 so that the control unit 33c can confirm that an abnormal response is received.

When an affirmative determination is made in step S120, the process proceeds to step S125 and step S130; the same process as the sensor transceiver 2 with ID1 is performed for the sensor transceiver 2 with ID2 this time. That is, by instructing the transmission unit 33a to transmit a request signal to the sensor transceiver 2 of ID2, the request signal including ID2 is transmitted from the transmission unit 33a through the antenna 32. Subsequently it is determined whether a normal response is received from the sensor transceiver 2 with ID2. Again, when a normal response is received from the sensor transceiver 2 with ID2, an affirmative determination is made in step S130, and when not, a negative determination is made in step S130.

When an affirmative determination is made in step S130, the process proceeds to step S135 and step S140; the same process as the sensor transceiver 2 with ID1 is performed for the sensor transceiver 2 with ID3 this time. Then, when it is determined in step S140 that a normal response is received from the sensor transceiver 2 of ID3, an affirmative determination is made. When it is determined in step S140 that a normal response is not received, a negative determination is made.

When an affirmative determination is made in step S140, the process proceeds to step S145 and step S150; the same process as the sensor transceiver 2 with ID1 is performed finally for the sensor transceiver 2 with ID4 this time. Then, when it is determined in step S150 that a normal response is received from the sensor transceiver 2 of ID4, an affirmative determination is made. When it is determined in step S150 that a normal response is not received, a negative determination is made. If an affirmative determination is made here, the process proceeds to step S155, the recognition of the tire pressure is completed for all the sensor transceivers 2 of ID1 to ID4, and the process is ended.

In contrast, when the negative determinations are made in steps S120, S130, S140, and S150, the process proceeds to, respectively, steps S160, S170, S180, and S190. Then, in each step, it is determined whether an abnormal response is received. When an abnormal response is received, any tire pressure cannot be detected; thus, the process is ended as it is. In this case, for example, a signal indicating that the tire pressure cannot be detected may be sent to the notification apparatus 31; the notification apparatus 31 may be used to notify the user that the tire pressure cannot be detected.

When any abnormal response is received, the process proceeds to, respectively, steps S165, S175, S185, and S195. In each step, it is determined whether TIMEOUT has been made after a lapse of a predetermined period of time with no response. When an affirmative determination is made here, the process is also ended. When a negative determination is made here, the process returns to steps S120, S130, S140, and S150, respectively, and the process is repeated.

Then, when the recognition of the tire pressure of each of the wheels 4a to 4d is completed, it is determined whether the tire pressure is decreased. When the tire pressure is decreased, the notification apparatus 31 is instructed to report the decrease of the tire pressure. This enables the notification that notifies the user of the decrease in the tire pressure through the notification apparatus 31.

Figure 5:
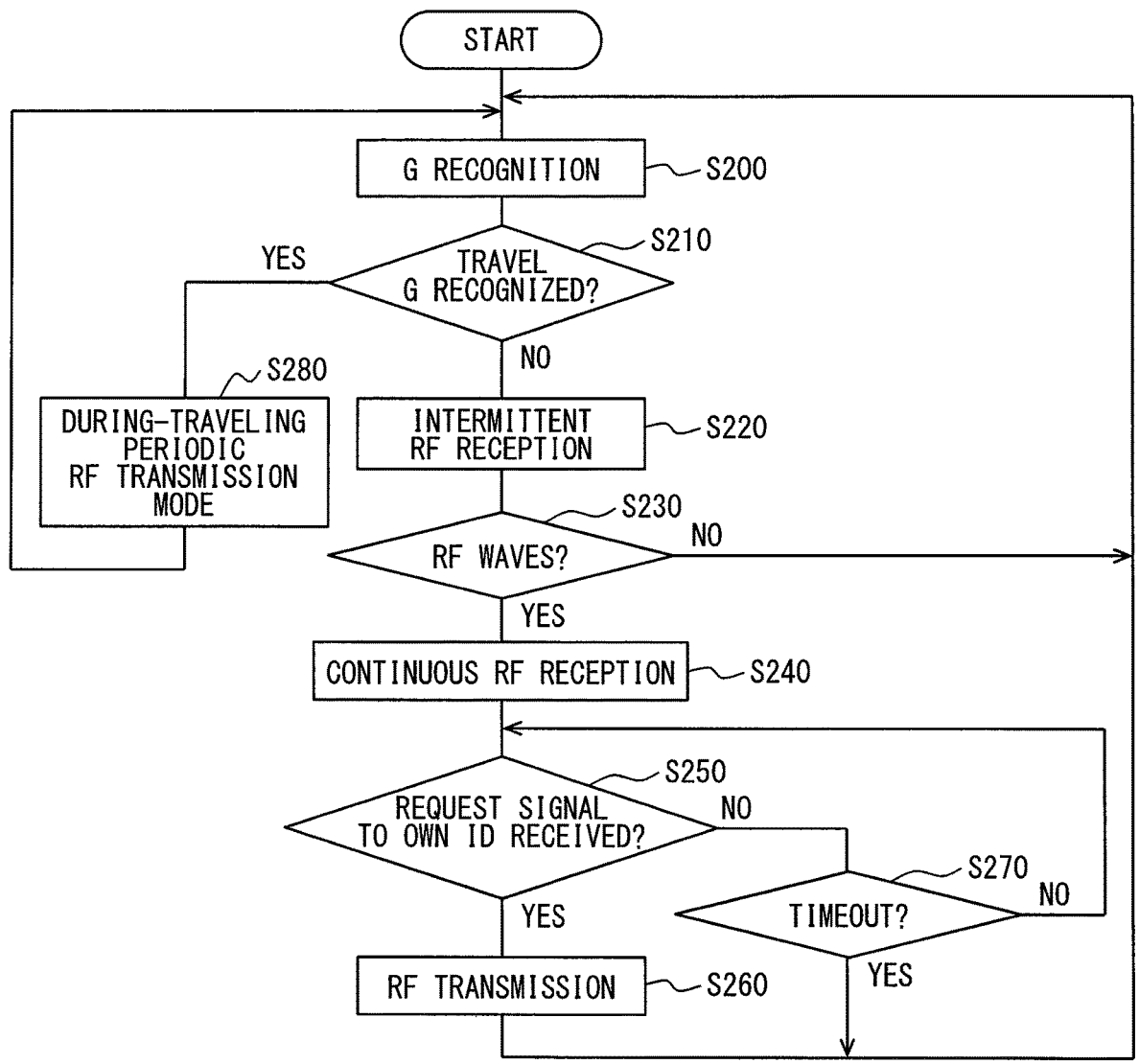
FIG. 5 is a flowchart showing details of a sensor response process executed by a control unit of a sensor transceiver.

In contrast, in the sensor transceiver 2, the control unit 22a performs a sensor response process shown in FIG. 5 every predetermined control cycle.

First, in step S200, the control unit 22a recognizes an acceleration from the detection signal of the acceleration sensor 21c, as an acceleration recognition process. Then, the process proceeds to step S210, where it is determined whether the traveling acceleration G is recognized. When the vehicle 1 travels, an acceleration component in the centrifugal direction is included in the detection signal of the acceleration sensor 21c, in addition to the gravitational acceleration. Such an acceleration component in the centrifugal direction is based on the rotation of each of the wheels 4a to 4d to which the sensor transceiver 2 is attached. It is assumed that the acceleration component in the centrifugal direction is a traveling acceleration G. When the acceleration component in the centrifugal direction is recognized, it is assumed that the traveling acceleration G is determined to be recognized. When a negative determination is made in step S210, the process proceeds to step S220 to perform an intermittent RF reception process. That is, the control unit 22a puts the reception unit 22c into a standby state that is capable of intermittently receiving RF waves.

Thereafter, the process proceeds to step S230. In step S230, it is determined whether the reception of the RF waves, or more specifically, it is determined whether a burst signal is received. The processing in above steps S200 to S220 is repeated until a burst signal is received. When a burst signal is received, the process proceeds to step S240.

In step S240, a continuous RF reception process is performed. That is, the control unit 22a sets the reception unit 22c in a standby state capable of continuously receiving RF waves. As a result, the reception unit 22c is in a standby state capable of continuously receiving RF waves until a request signal arrives. Thereafter, in step S250, it is determined whether a request signal including its own ID information-item is received. When the request signal is received, the process proceeds to step S260, where a frame storing data on tire pressure together with its own ID information-item is transmitted on RF waves as a response to the request signal. In contrast, when a request signal is not received, the process proceeds to step S270, where it is determined whether TIMEOUT is made after a predetermined period of time elapses without receiving a request signal. Then, until TIMEOUT is made, steps S240 and S250 are repeated. When TIMEOUT is made, the process is repeated from step S200 again.

In contrast, when an affirmative determination is made in step S210, the process proceeds to step S280, where the periodical RF transmission mode during traveling is set. As a result, the periodical RF transmission is performed such that a frame storing the data on tire pressure along with its own ID information-item is transmitted repeatedly every predetermined periodic transmission cycle.

FIG. 6 is a time chart taking place when the above operation is performed. Before time ta, the IG is in OFF state and each sensor transceiver 2 is in a standby state that is capable of intermittently receiving RF waves. For instance, in the standby state, RF waves can be received for a period of time t that takes place repeatedly every predetermined cycle T. The predetermined cycle T is set to be shorter than the transmission period of time TB of a burst signal. The current consumption in this period of time t is 12 mA, for instance.

In response to that the IG switches from OFF state to ON state at time ta, a burst signal is started to be transmitted on RF waves from the transceiver 30 of the vehicle-body system 3. When receiving this burst signal, each sensor transceiver 2 transitions into a standby state capable of receiving RF waves and remains in the standby state until receiving the RF waves (i.e., request signal) onto which its own ID information-item is attached.

Thereafter, at time tb, the vehicle-body system 3 outputs a request signal with ID1 and enters a standby state that is capable of receiving RF waves so as to receive a response on RF waves from the sensor transceiver 2 with ID1. In contrast, the sensor transceiver 2 with ID1 responds to the request signal to cancel the standby state that is capable of receiving the RF waves, and then transmits a frame including the data on tire pressure as a response to the request signal at time tc.

Further, when a request signal with ID2 is outputted from the vehicle-body system 3 at time td, the same processing as above is performed. That is, a frame including the data on tire pressure is transmitted at time to from the sensor transmitter with ID2. Similarly, when a request signal with ID3 is outputted at time tf from the vehicle-body system 3, a frame including the data on tire pressure is transmitted at time tg from the sensor transmitter with ID3. Finally, when the request signal with ID4 is output at time th from the vehicle-body system 3, a frame including the data on tire pressure is transmitted at time ti from the sensor transmitter with ID4.

In this way, in response to the request signal from the vehicle-body system 3, the frames including the data on tire pressure are sent from the respective sensor transceivers 2 with ID1 to ID4 and received by the vehicle-body system 3. The tire pressures of the wheels 4a to 4d are thereby detected. This configuration enables the detection of the tire pressures of the wheels 4a to 4d immediately after the IG switches from OFF state to ON state. In addition, since each sensor transceiver 2 is placed in a standby state in which RF waves can be received intermittently, not continuously, the current consumption may be reduced. Further, the cycle T at which the RF waves can be intermittently received by each sensor transceiver 2 is set to be shorter than the transmission period of time for a burst signal. Each sensor transceiver 2 is thus enabled to reliably receive a burst signal.

Thereafter, if the traveling acceleration G is not recognized, each sensor transceiver 2 enters a standby state capable of intermittently receiving RF waves again from time tj after the lapse of a predetermined period of time. Then, when the traveling acceleration G is recognized, the periodic RF transmission mode is set in which the data on tire pressure is transmitted repeatedly every periodical transmission cycle.

As described above, in the TPMS according to the present embodiment, the sensor transceiver 2 is enabled to be in a state capable of intermittently receiving RF waves. Further, when a burst signal is transmitted on RF waves from the vehicle-body system 3, the sensor transceiver 2 can be brought into a state capable of continuously receiving RF waves. In response to transitioning into a state capable of receiving RF waves, the sensor transceiver 2 transmits the data on tire pressure to the vehicle-body system 3 based on a request signal from the vehicle-body system 3. The detection of the tire pressure is thus enabled to be earlier.

At this time, before receiving the burst signal, the sensor transceiver 2 is placed in a standby state capable of receiving RF waves, but only receiving RF waves intermittently. The current consumption can be reduced. Furthermore, an installation of an antenna or the like for transmitting the LF waves near each wheel is unnecessary.

Therefore, even without the installation of an antenna or the like for transmitting LF waves in the vicinity of each wheel, a TPMS capable of detecting a tire pressure earlier is enabled to be provided while suppressing an increase in current consumption.

Other Embodiments

Although the present disclosure is made based on the embodiment described above, the present disclosure is not limited to such embodiment but includes various changes and modifications which are within equivalent ranges. In addition, while various combinations and configurations, which are preferred, other combinations and configurations including further only a single element, more or less, are also within the spirit and scope of the present disclosure.

For example, the TPMS explained here is to detect a tire pressure quickly when detecting a possibility that the vehicle 1 starts to run. In the above embodiment, for example, a situation where there is a possibility that the vehicle 1 starts to run is described with an example of the case where the IG is switched from OFF state to ON state. Further, the possibility that the vehicle 1 starts to run may be determined when at least one condition of the followings is satisfied. For example, on condition that a door of the vehicle 1 is switched from a locked state to an unlocked state by a mechanical key or a remote key, it may be determined that there is a possibility that the vehicle 1 starts to run. There is also a smart key system (registered trademark) that automatically opens and closes a door of the vehicle 1 using an electronic key called smart key (registered trademark) without using a mechanical key. In this system, when it is authenticated that the electronic key is within a predetermined authentication range from the door, it may be determined that there is a possibility that the vehicle 1 starts to run.

Further, in the above embodiment, the transceiver 30 of the vehicle-body system 3 includes a transmission unit 33a and a reception unit 33b, respectively, capable of transmitting and receiving RF waves. In contrast, suppose a case where a different system is provided with a configuration capable of transmitting and receiving RF waves, that is, capable of bidirectional communication. In this case, such a configuration of the different system may be used to perform bidirectional communication with each sensor transceiver 2. It is thereby possible to share parts and further reduce the number of parts. For example, a smart key system includes a configuration provided in the vehicle 1 for performing bidirectional communication with an electronic key. It is also possible to perform bidirectional communication with each sensor transceiver 2 using such a configuration in the system.

Furthermore, in the above embodiment, the IG is described as an example of a startup switch operated when the vehicle 1 is started. This is described by taking the case where this disclosure is applied to a vehicle with an internal combustion engine as an example; the start switch is not necessarily the IG. For example, in a case of an electric vehicle, a hybrid vehicle or the like, there are cases where the start switch is configured by a push switch or the like; the present disclosure can also be applied to such a case.

What is claimed is:

1. A tire pressure monitoring system applied to a vehicle having a vehicle body which a plurality of wheels are attached to, the plurality of wheels being equipped with and respectively corresponding to a plurality of tires,
the tire pressure monitoring system comprising:
a plurality of sensor transceivers provided to and respectively corresponding to the plurality of wheels; and
a vehicle-body system provided in the vehicle body,
each of the sensor transceivers comprising:
a sensing unit configured to detect a tire pressure of a tire of a corresponding wheel among the plurality of wheels;
a first control unit configured to prepare a frame that stores data regarding the tire pressure;
a first transmission unit configured to transmit the frame prepared by the first control unit on RF waves; and
a first reception unit configured to receive RF waves,
the vehicle-body system comprising:
a second reception unit configured to receive a frame transmitted from each of the sensor transceivers;
a second control unit configured to detect a respective tire pressure of each of the tires of the plurality of wheels based on the received frame; and
a second transmission unit configured to transmit RF waves to be received by the first reception unit,
wherein in the vehicle-body system,
in response to detecting that there is a possibility that the vehicle starts to run, the second control unit outputs, on RF waves, a burst signal and then a request signal to each of the sensor transceivers,
the burst signal causing the first reception unit of each of the sensor transceivers to transition into a state that is capable of continuously receiving RF waves,
the request signal requesting each of the sensor transceivers to transmit the frame,
wherein, in each of the sensor transceivers,
the first control unit sets the first reception unit to a standby state that is capable of intermittently receiving RF waves,
in response to the first reception unit receiving the burst signal under the standby state, the first control unit causes the first reception unit to transition into the state capable of continuously receiving RF waves to receive the request signal, and
in response to the first reception unit receiving the request signal, the first control unit transmits the frame as a response to the request signal.

2. The tire pressure monitoring system according to claim 1, wherein
a cycle at which the first reception unit transitions into the standby state capable of intermittently receiving RF waves is shorter than a transmission period of time during which the burst signal is transmitted.

3. The tire pressure monitoring system according to claim 1, wherein
in response to receiving the request signal, the first control unit releases the first reception unit from the standby state and then transmits the frame.

4. The tire pressure monitoring system according to claim 1, wherein:
the sensor transceiver provided to a corresponding wheel among the plurality of wheels has a unique identification information-item; and
the second control unit sequentially
assigns the plurality of sensor transceivers with respective unique identification information-items and
transmits a plurality of request signals to the sensor transceivers, respectively, with mutually different transmission time frames.

5. The tire pressure monitoring system according to claim 1, wherein:
each of the sensor transceivers includes an acceleration sensor and detects an acceleration of the vehicle based on a detection signal by the acceleration sensor; and
in response to the acceleration not being detected after the frame is transmitted as the response to the request signal, the first control unit causes, after a predetermined period of time elapses, the first reception unit to again transition into the standby state.

6. The tire pressure monitoring system according to claim 1, wherein
the first transmission unit and the first reception unit are integrated into a common part.

7. The tire pressure monitoring system according to claim 1, wherein
the second transmission unit and the second reception unit are integrated into a common part.

8. The tire pressure monitoring system according to claim 1, wherein
that there is a possibility that the vehicle starts to run is determined in response to that at least one of conditions, which include a first condition, a second condition, and a third condition, is satisfied,
the first condition being a condition that an ignition switch provided in the vehicle switches from OFF state to ON state,
the second condition being a condition that a door of the vehicle switches from a locked state to an unlocked state by a mechanical key or a remote key,
the third condition being a condition that an electronic key is determined to be within a predetermined authentication range from a door of the vehicle.

\* \* \* \* \*